(12) United States Patent
Fenton et al.

(10) Patent No.: US 7,540,085 B2
(45) Date of Patent: Jun. 2, 2009

(54) METHOD OF CONSTRUCTING A CARGO BODY UTILIZING A PLURALITY OF PANELS

(75) Inventors: Gary L. Fenton, Edgerton, WI (US); Jeffrey W. Liebelt, Janesville, WI (US)

(73) Assignee: STI Holdings, Inc., Stoughton, WI (US)

( * ) Notice: Subject to any disclaimer, the term of this patent is extended or adjusted under 35 U.S.C. 154(b) by 553 days.

(21) Appl. No.: 11/086,515

(22) Filed: Mar. 22, 2005

(65) Prior Publication Data

US 2005/0161977 A1 Jul. 28, 2005

Related U.S. Application Data

(63) Continuation of application No. 10/449,809, filed on May 30, 2003, now Pat. No. 6,893,075.

(51) Int. Cl.
*B21D 47/00* (2006.01)
(52) U.S. Cl. ............... 29/897.32; 29/897; 29/897.2; 29/428; 29/505.01; 296/181.3; 296/181.1; 296/191
(58) Field of Classification Search ............ 29/897, 29/897.2, 428, 525.01, 897.32; 296/181, 296/52, 191, 199
See application file for complete search history.

(56) References Cited

U.S. PATENT DOCUMENTS

| | | |
|---|---|---|
| 1,744,824 A | 1/1930 | Callison |
| 2,003,287 A | 6/1935 | Fitch |
| 2,478,993 A | 8/1949 | Wing |
| 2,934,372 A | 4/1960 | Jewell et al. |
| 2,991,116 A | 7/1961 | Andrews |
| 3,266,837 A | 8/1966 | Stricker, Jr. et al. |
| 3,386,218 A | 6/1968 | Scott |
| 3,815,500 A | 6/1974 | Glassmeyer |
| 3,834,575 A | 9/1974 | Carr |
| 3,842,755 A | 10/1974 | Carr |
| 3,842,756 A | 10/1974 | Marulic |

(Continued)

FOREIGN PATENT DOCUMENTS

DE 3737210 5/1989

(Continued)

OTHER PUBLICATIONS

Stoughton Trailers, Inc.; Stoughton Model AEDCW—Domestic Container brochure; Aluminum, Exterior Post, Hi-Cube; published prior to May 2002.

(Continued)

*Primary Examiner*—Rick K Chang
(74) *Attorney, Agent, or Firm*—Whyte Hirschboeck Dudek SC (57) ABSTRACT

A method of constructing a cargo body, including providing a first cargo body panel having a main portion with a thickness and providing a second cargo body panel. Further, forming a post portion in the first cargo body panel integrally with the main portion and forming a base portion of the post portion. Additionally, forming a distal portion of the post portion that is located a distance from the base portion that is substantially greater than the thickness of the main portion. In addition, overlapping at least part of the first cargo body panel over the second cargo body panel.

23 Claims, 4 Drawing Sheets

U.S. PATENT DOCUMENTS

| | | |
|---|---|---|
| 4,018,480 A | 4/1977 | Stone |
| 4,045,927 A | 9/1977 | Diaz |
| 4,065,168 A | 12/1977 | Gregg |
| 4,104,840 A | 8/1978 | Heintz et al. |
| 4,212,405 A | 7/1980 | Schmidt |
| 4,262,961 A | 4/1981 | Schmidt |
| 4,357,047 A | 11/1982 | Katz |
| 4,433,522 A | 2/1984 | Yerushalmi |
| 4,455,807 A | 6/1984 | Ehrlich |
| 4,656,809 A | 4/1987 | Wilson |
| 4,685,721 A | 8/1987 | Banerjea |
| 4,703,948 A | 11/1987 | Ehrlich |
| 4,810,027 A | 3/1989 | Ehrlich |
| 4,904,017 A | 2/1990 | Ehrlich |
| 4,940,279 A | 7/1990 | Abott et al. |
| 4,958,472 A | 9/1990 | Ehrlich |
| 5,058,756 A | 10/1991 | Green |
| 5,066,066 A | 11/1991 | Yurgevich et al. |
| 5,112,099 A | 5/1992 | Yurgevich et al. |
| 5,154,302 A | 10/1992 | Alcorn |
| 5,178,292 A | 1/1993 | Korzeniowski |
| 5,195,800 A | 3/1993 | Stafford et al. |
| 5,255,806 A | 10/1993 | Korzeniowski et al. |
| 5,286,079 A | 2/1994 | Zubko et al. |
| 5,433,501 A | 7/1995 | Thomas et al. |
| 5,439,266 A | 8/1995 | Ehrlich |
| 5,507,405 A | 4/1996 | Thomas et al. |
| 5,509,714 A * | 4/1996 | Schmidt .................. 296/186.1 |
| 5,526,622 A | 6/1996 | Augustine |
| 5,562,981 A | 10/1996 | Ehrlich |
| 5,584,252 A | 12/1996 | Smith et al. |
| 5,584,527 A | 12/1996 | Sitter |
| 5,700,118 A | 12/1997 | Bennett et al. |
| 5,702,151 A | 12/1997 | Grote et al. |
| 5,704,676 A | 1/1998 | Hill |
| 5,741,042 A | 4/1998 | Livingston et al. |
| 5,755,349 A | 5/1998 | Brundle |
| 5,772,276 A | 6/1998 | Fetz et al. |
| 5,784,769 A * | 7/1998 | Clare ........................ 29/401.1 |
| D398,264 S | 9/1998 | Fetz et al. |
| 5,860,693 A | 1/1999 | Ehrlich |
| 5,876,089 A | 3/1999 | Ehrlich |
| 5,934,742 A | 8/1999 | Fenton et al. |
| 5,938,274 A | 8/1999 | Ehrlich |
| 5,992,117 A | 11/1999 | Schmidt |
| 5,997,076 A | 12/1999 | Ehrlich |
| 6,003,932 A | 12/1999 | Banerjea et al. |
| 6,010,020 A | 1/2000 | Abal |
| 6,106,205 A | 8/2000 | Haire |
| 6,199,939 B1 | 3/2001 | Ehrlich |
| 6,220,651 B1 | 4/2001 | Ehrlich |
| 6,349,988 B1 | 2/2002 | Foster et al. |
| 6,450,564 B1 | 9/2002 | Sill |
| 6,527,335 B1 | 3/2003 | Yurgevich |
| 6,578,902 B2 | 6/2003 | Sill |
| 6,652,019 B1 | 11/2003 | Bennett |
| 6,893,075 B2 | 5/2005 | Fenton et al. |
| 2002/0098053 A1 | 7/2002 | Zubko |

FOREIGN PATENT DOCUMENTS

| | | |
|---|---|---|
| EP | 119668 | 9/1984 |
| EP | 618130 | 10/1994 |

OTHER PUBLICATIONS

Stoughton Trailers, Inc.; Stoughton Model ASDCW—Domestic Container brochure; Aluminum, Smooth Side, Hi-Cube; published prior to May 2002.

Stoughton Trailers, Inc.; Stoughton New Doubles Van brochure; Feb. 1998.

Stoughton Trailers, Inc.; Stoughton New Hi-Cube Plate Van brochure; Apr. 1997.

Stoughton Trailers, Inc.; Stoughton We'll change the way you look at trailers brochure; Sep. 2000.

* cited by examiner

METHOD OF CONSTRUCTING A CARGO BODY UTILIZING A PLURALITY OF PANELS

This is a continuation of U.S. patent application Ser. No. 10/449,809 filed on May 30, 2003 and issued on May 17, 2005 as U.S. Pat. No. 6,893,075, the entire contents of which are incorporated herein by reference.

BACKGROUND OF THE INVENTION

This invention relates to cargo body constructions. More particularly, this invention relates to cargo body constructions that include the use of overlapping sidewall panels.

Various cargo body constructions (e.g., "sheet and post" constructions, "plate wall" constructions, and the like) have been used in the past. Nevertheless, an improved cargo body construction that provides enhanced performance, ease of assembly, and reduced costs would be welcomed by those in the art.

SUMMARY OF THE INVENTION

In some embodiments of the present invention, a cargo body is provided having at least two cargo body panels at least partially overlapping each other. Each of the at least two panels includes a main portion and a post portion. The main portion has a thickness. The post portion is integrally formed with the main portion and has a base portion and a distal portion. The distal portion is spaced apart from the base portion by a distance substantially greater than the thickness of the main portion.

In other embodiments, the invention provides a cargo body having multiple overlapping panels forming inside and outside wall surfaces of the cargo body. Each of the panels includes an integrally formed post portion, a main portion, and an offset portion. The post portion includes a post plateau that defines a first plane. The main portion has a thickness and defines a second plane substantially parallel to the first plane and spaced apart from the first plane by a distance substantially greater than the thickness of the main portion. The offset portion defines a third plane spaced apart from and located between the first and second planes. The main portion of a majority of each panel overlaps the offset portion of another panel so that the main portions of the panels are substantially coplanar.

In still other embodiments, the invention provides a method of assembling a cargo body that includes overlapping at least a portion of first and second cargo panels, and fastening the overlapped portions to each other. The first cargo body panel includes a first main portion having a first thickness and defining a first plane, and a first post portion integrally formed with the first main portion and having a first post plateau defining a second plane substantially parallel to the first plane and spaced apart from the first plane by a first distance substantially greater than the first thickness. The second cargo body panel includes a second main portion having a second thickness and defining a third plane, and a second post portion integrally formed with the second main portion and having a second post plateau defining a fourth plane substantially parallel to the third plane and spaced apart from the third plane by a second distance substantially greater than the second thickness.

Further objects of the present invention together with the organization and manner of operation thereof, will become apparent from the following detailed description of the invention when taken in conjunction with the accompanying drawings wherein like elements have like numerals throughout the drawings.

BRIEF DESCRIPTION OF THE DRAWINGS

The present invention is further described with reference to the accompanying drawings, which show embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

DETAILED DESCRIPTION OF THE PREFERRED EMBODIMENTS

As used herein and in the appended claims, the term "cargo body" refers to a trailer, cargo container, truck body, or other cargo carrying body. Also, the term "sidewall" is not limited to the longitudinal walls of a cargo body, and includes any walls (e.g., front walls, rear wall, walls connecting the front and rear walls, and the like) of a cargo body.

Figure 1:
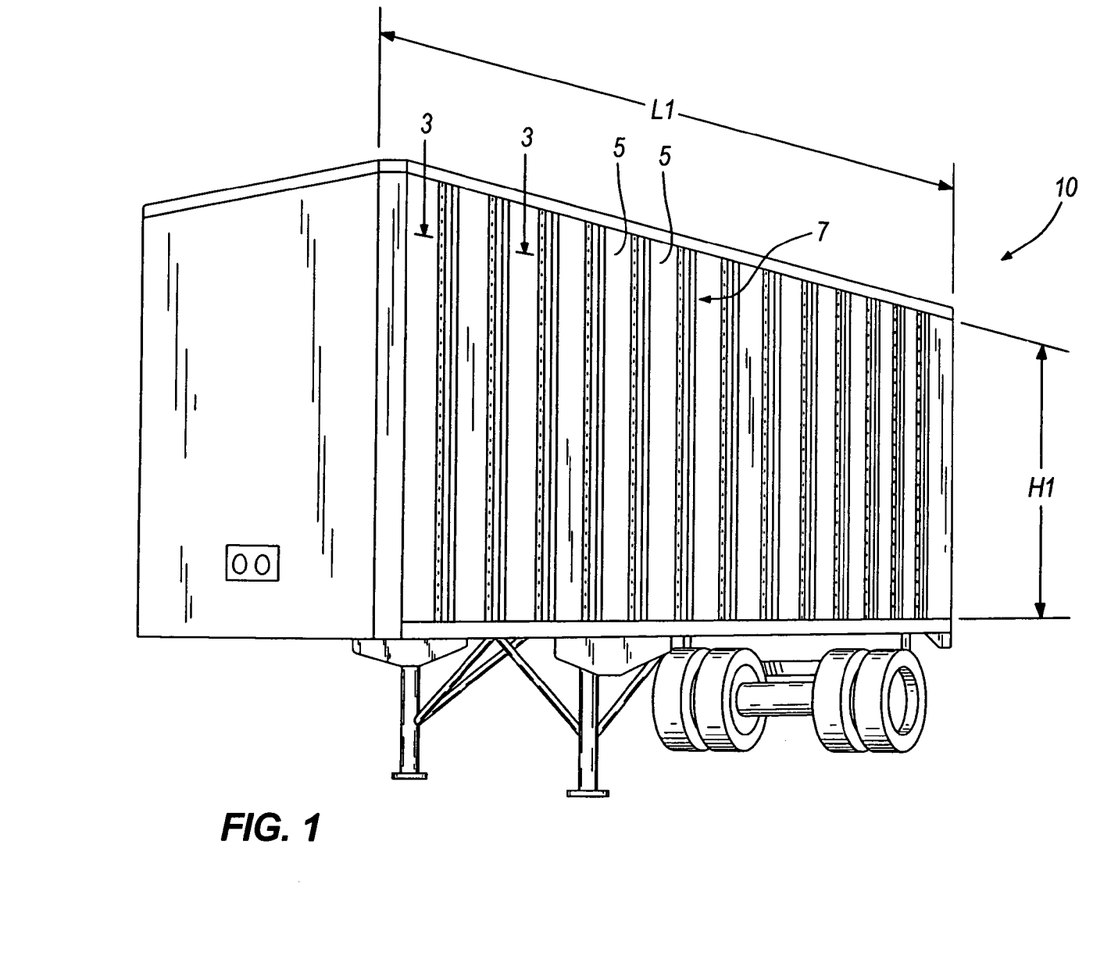
FIG. 1 is a perspective view of a trailer having sidewall panels, in accordance with one embodiment of the present invention.

With reference to FIG. 1, consecutive sidewall panels 5 of the present invention are overlapped to form a sidewall 7 of a trailer 10. Although the embodiments of the present invention described below and illustrated in the figures are presented with reference to the trailer 10, it should be noted that the present invention can be employed in any cargo body or box-type structure used to carry freight, whether permanently or removably secured with respect to a vehicle and whether having dedicated wheels or not.

The sidewall panels 5 are formed of steel or other metal (e.g., aluminum) using a forming process (e.g., roll forming, break press, or the like). By way of example only, in some embodiments the sidewall panels 5 are formed of 0.038 inch thick, ASTM 653, grade 80 steel, although panels having other thicknesses, meeting other specifications, and having other grades can instead be employed. In other embodiments, the sidewall panels 5 are formed or constructed of other materials suitable for a trailer sidewall, such as composite material panels having a plastic, paper, or epoxy core sheathed in a metal skin, laminate panels, hollow-core panels, panels having a core filled with any desired material, and panels made from metal, plastic, fiberglass, and the like. The sidewall panels 5, or portions thereof, can additionally be covered with a coating (e.g., paint), if desired.

Figure 2:
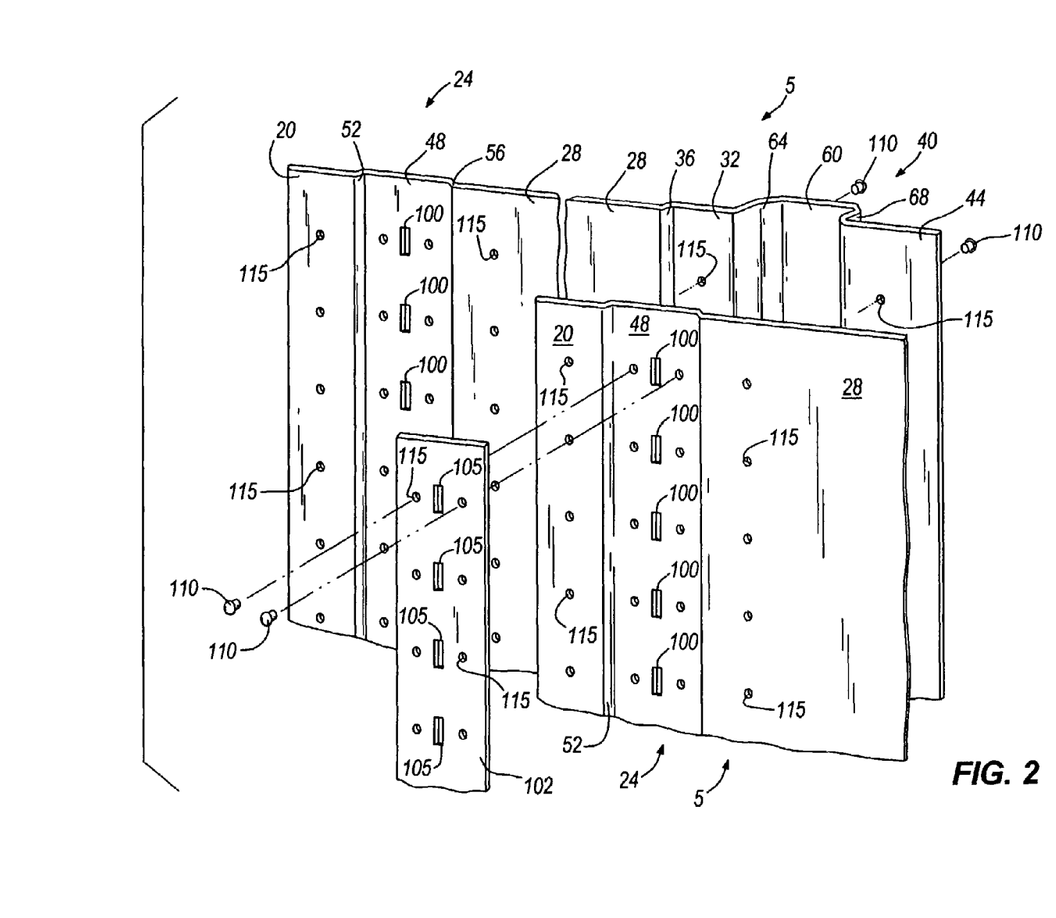
FIG. 2 is an exploded perspective view of an overlapping joint formed by two consecutive sidewall panels of the trailer illustrated in FIG. 1.

Referring specifically to FIG. 2 (each panel 5 having features designated by reference numerals ending in "a" or "b"), the sidewall panel 5 includes a first main portion 20, a stiffening portion 24, a second main portion 28, a first offset portion 32, an offset jogged portion 36 serving as a transition between the second main portion 28 and the first offset portion 32, a post portion 40, and a second offset portion 44. The stiffening portion 24 includes a stiffening plateau 48, a first stiffening jogged portion 52 serving as a transition between the first main portion 20 and the stiffening plateau 48, and a second stiffening jogged portion 56 serving as a transition between the stiffening plateau 48 and the second main portion 28. The post portion 40 includes a post plateau 60, a first post jogged portion 64 serving as a transition between the first offset portion 32 and the post plateau 60, and a second post jogged portion 68 serving as a transition between the post plateau 60 and the second offset portion 44.

Figure 3:
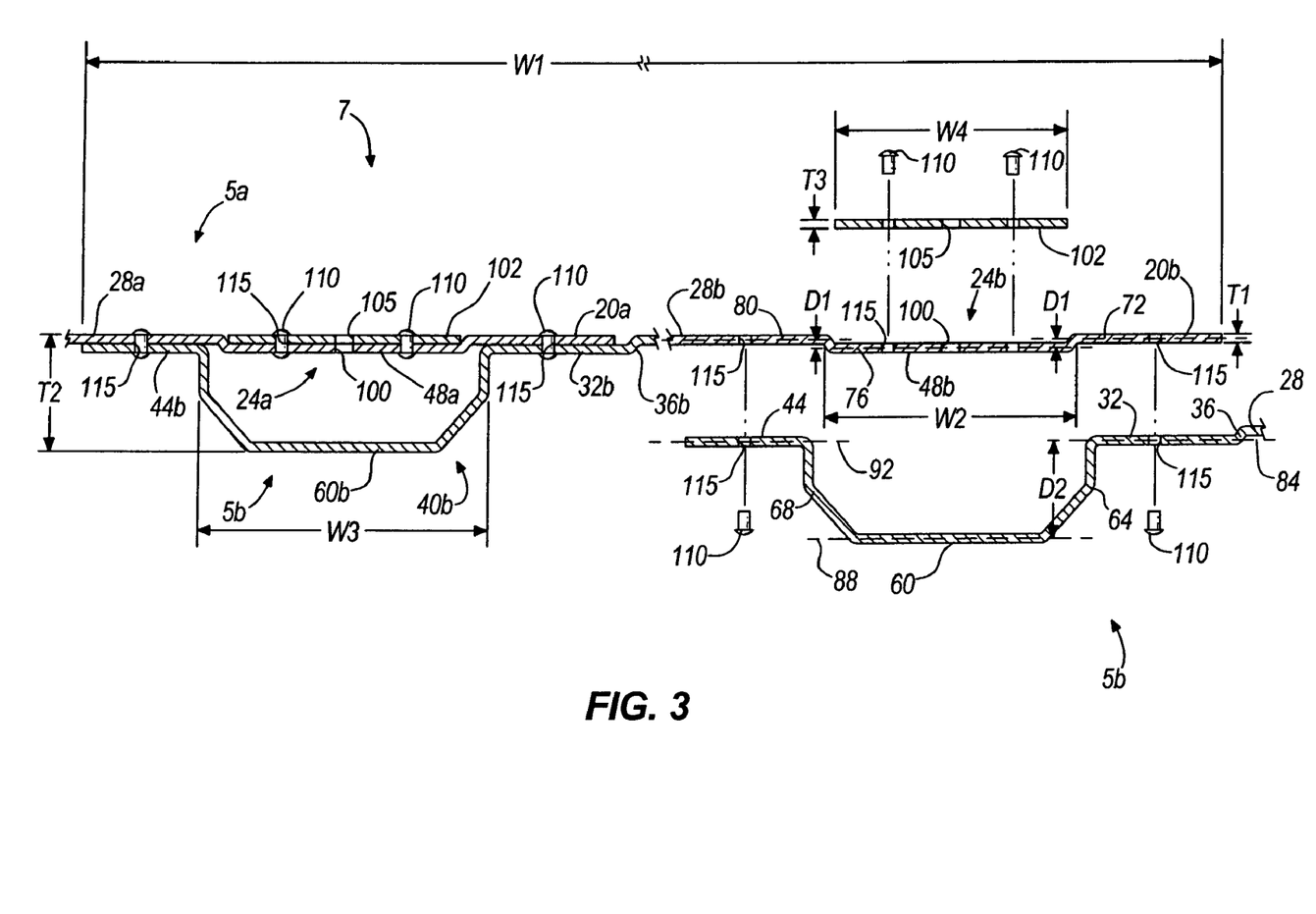
FIG. 3 is a partially exploded sectional view of the sidewall illustrated in FIG. 1, taken along line 3-3 of FIG. 1.

As seen in FIGS. 2 and 3, it is apparent that the jogged portions 36, 52, 56, 64, and 68 serve as a transitions without varying a thickness T1 (e.g., 0.038 inches) of the sidewall panel 5. Put another way, the thickness T1 of the sidewall panel 5 remains consistent throughout. In other embodiments, the thickness T1 of the sidewall panel 5 can vary, such as at the jogged portions 36, 52, 56, 64, and/or 68 or at corners defining the jogged portions 36, 52, 56, 64, and/or 68. In many cases, the manner in which the sidewall panel 5 is manufactured (such as by stamping, pressing, extruding, molding, coining, and other operations) will often at least partially determine whether the sidewall panel 5 has a constant or substantially constant thickness throughout.

The jogged portions 36, 52, 56, 64, and 68 can be defined by a number of different panel transitions, including without limitation sloped transitions, curved transitions, perpendicular transitions, transitions having any combination of sloped portions, perpendicular portions, curved portions and/or parallel portions, and the like.

Referring specifically to FIG. 3, the sidewall panels 5 illustrated therein are configured such that the first main portion 20 defines a plane 72, the stiffening plateau 48 defines a plane 76, the second main portion 28 defines a plane 80, the first offset portion 32 defines a plane 84, the post plateau 60 defines a plane 88, and the second offset portion 44 defines a plane 92, where each plane 72, 76, 80, 84, 88, and 92 is positioned at the center of the thickness of the first main portion 20, the stiffening plateau 48, the second main portion 28, the first offset portion 32, the post plateau 60, and the second offset portion 44, respectively. In embodiments where the first main portion 20, the stiffening plateau 48, the second main portion 28, the first offset portion 32, the post plateau 60, and/or the second offset portion 44 are not planar (e.g., are curved inboard or outboard or otherwise are not flat, such as a post plateau that is bowed in an outboard direction), each plane 72, 76, 80, 84, 88, and 92 is defined about a point of the respective portion or plateau (e.g., the midpoint). In this regard, it should be noted that a post plateau 60 need not necessarily be flat such as those shown in the figures.

In some embodiments of the present invention, the planes 72, 76, 80, 84, 88, and 92 are substantially parallel to one another. Also, in some embodiments the plane 72 defined by the first main portion 20 is coplanar with the plane 80 defined by the second main portion 28, and/or the plane 84 defined by the first offset portion 32 is coplanar with the plane 92 defined by the second offset portion 44.

With continued reference to the FIG. 3, the plane 76 defined by the stiffening plateau 48 is spaced apart from the planes 72 and 80 defined by the first and second main portions 20 and 28, respectively, by a distance D1. In some embodiments, the distance D1 is about twice the thickness of the first and second main portions 20 and 28. By way of example only, the distance D1 can be approximately 0.08 inches (or approximately 2 times the thickness of a 0.038 inch thick sidewall panel). In other embodiments, the distance D1 is smaller or larger. By way of example only, in some embodiments, a distance D1 between 0 inches and 3/16 inches provides good structural performance for the stiffening plateau.

In other embodiments, a distance D1 between 0 and 1/8 inches is employed for good structural performance.

The plane 88 defined by the post plateau 60 is spaced apart from the planes 84 and 92 defined by the first and/or second offset portion 32 and 44, respectively, by a distance D2. The distance D2 can be measured from either plane 84, 92 (in cases where these planes 84, 92 are not co-planar), or can be measured from both planes 84, 92 as is shown in the illustrated embodiment. The distance D2 can also be measured from a base portion of the post portion 40 (i.e., the portions of the post portion 40 adjacent the first and/or second offset portions 32 and 44) to a distal portion of the post portion 40 (e.g., a portion of the post plateau 60 or, in those embodiments where an identifiable post plateau 60 does not exist, the portion of the post portion 40 that is located furthest from the base portion of the post portion 40). By way of example only, the distance D2 of a post portion 40 having a round cross-sectional area with no identifiable post plateau 60 can be defined as the distance between a plane tangent to the outermost or distal portion of the post portion 40 and either or both planes 84, 92.

The inventor has found that use of a sidewall panel 5 that defines a distance D2 that is substantially more than the thickness T1 of the sidewall panel 5 provides good structural performance of the sidewall panels 5 and of the sidewall 7 formed using the sidewall panels 5. By way of example, in some embodiment a distance D2 of approximately 0.937 inches (or approximately 25 times the thickness of a 0.038 inch thick sidewall panel) provides good structural performance. In other embodiments, a distance D2 between 0.80 inches and 1.33 inches (or approximately between 21 times and 35 times the thickness of a 0.038 inch thick sidewall panel) provides good structural performance. In other embodiments, a distance D2 between 0.65 and 1.71 inches (or approximately between 17 times and 45 times the thickness of a 0.038 inch thick sidewall panel) provides good structural performance. In other embodiments, a distance D2 between 0.50 inches and 2.00 inches (or approximately between 13 times and 53 times the thickness of a 0.038 inch thick sidewall panel) provides good structural performance. In still other embodiments, a distance D2 that is larger or smaller than the distances D2 define above can provide good structural performance. Although the sidewall panels 5 can have any thickness desired, and the distance D2 can be any size desired, the distance D2 should be defined to provide a sidewall panel that includes good structural performance of a sidewall formed using the sidewall panels. The structural specifications of a sidewall may vary based on the application of the cargo body.

As shown in FIG. 3, the sidewall panel 5 defines a width W1, the stiffening portion 24 defines a width W2, and the post portion 40 defines a width W3, where each width W1, W2, and W3 is defined as the width of the sidewall panel 5, the stiffening portion 24, and the post portion 40, respectively, measured in cross-section. Although these widths W1, W2, and W3 can be any size, in some embodiments W1, W2, and W3 are approximately 29 inches, 2.40 inches, and 2.75 inches, respectively.

It will be readily understood by one of ordinary skill in the art that the widths are not necessarily to scale in FIGS. 2 and 3, and that FIGS. 2 and 3 illustrate only a portion of the width W1 defined by the sidewall panel 5. Only part of the second main portion 28 is illustrated in FIGS. 2 and 3 illustrated by the break in the second main portion 28. In some embodiments, the width W2 defined by the stiffening portion 24 is substantially equal to but slightly less than the width W3 defined by the post portion 40. Such a construction allows the stiffening portion 24 to nest in the post portion 40 while additionally providing alignment features that assist in the assembly of the sidewall 7. The assembly of the sidewall panels 5 is discussed in greater detail below.

In order to enable cargo to be secured and/or stabilized within the trailer 10, the sidewall panel 5 has one or more logistics apertures 100. In some embodiments, the logistics apertures 100 are located in the stiffening plateau 48, and can take any shape and size desired. For example, the logistics apertures 100 can be rectangular as shown in FIG. 2, can have any other polygonal shape, can be round, oval, or irregularly-shaped, and the like. In some embodiments, such as that shown in FIG. 2, the logistics apertures 100 are elongated in a direction along a height H1 (e.g., 105 inches) of the trailer 10 (see FIG. 1). Each stiffening plateau 48 can have any number of logistics apertures 100 arranged in any manner. In one embodiment, the stiffening plateau 48 has a number of logistics apertures 100 aligned or substantially aligned along the center portion of the stiffening plateau 48 (see FIG. 3).

A number of different cargo securing devices or elements can be used to secure and stabilize cargo in the trailer 10. In some embodiments, logistics apertures 100 are provided in the stiffening plateau 48 as shown in FIGS. 2 and 3. Regardless of their location, the logistics apertures 100 can be shaped to receive or mate with any cargo securing devices or elements, including clamps, cargo strap ends, buckles, and the like. Therefore, the logistics apertures 100 in some embodiments are shaped to receive, mate with, and/or engage one or more of such cargo securing devices or elements. Alternatively, the logistics apertures 100 can be shaped to receive one or more such cargo securing devices or elements (including ropes, cord, chain, cable, and the like) passed into and out of one or more logistics apertures 100.

Referring now to FIG. 3, for assembly, a first sidewall panel 5a and a second sidewall panel 5b are overlapped to form an overlapping joint which defines overlapping portions on the first and second sidewall panels 5a and 5b, respectively. For discussion, the interior space of the trailer 10 is generally above the sidewall 7 illustrated in FIG. 3, and the space outside the trailer 10 is generally below the sidewall 7 illustrated in FIG. 3 (although this orientation can be reversed in some embodiments of the present invention as discussed further below). Additionally, the elements of each of the sidewall panels 5a and 5b are labeled to correspond to the sidewall panel 5a or 5b that includes the elements (e.g., the first main portion 20 of the first sidewall panel 5a is described and labeled as the first main portion 20a).

The overlapping joint of the panels 5a and 5b includes the first main portion 20a overlapping the first offset portion 32b and the second main portion 28a overlapping the second offset portion 44b such that the stiffening portion 24a is nested in the post portion 40b. Spacing apart the stiffening plateau 48a from the post plateau 60b provides room for a cargo-securing device or element to be partially or entirely received within the logistics apertures 100 while additionally providing added strength and rigidity to the sidewall 7.

In some embodiments, when the panels 5a and 5b are assembled, the planes 72a, 80a, 72b, and 80b are coplanar. However, this arrangement of the planes 72a, 80a, 72b, 80b is not required to practice the present invention. The planes 72a, 80a can be spaced from one another. In addition, either or both of the planes 72a, 80a can be spaced from either or both of the planes 72b, 80b. Similarly, in some embodiments, the planes 84a, 92a, 84b, and 92b are coplanar. However, this arrangement of the planes 84a, 92a, 84b, and 92b is not required to practice the present invention. The planes 84a, 92a can be spaced from one another. In addition, either or both of the planes 84a, 92a can be spaced from either or both of the planes 72b, 80b. Furthermore, in some embodiments, the planes 88a and 88b are coplanar, as are the planes 76a and 76b. However, neither of these relationships are required to practice the present invention.

The above-described co-planar relationships between the planes (72a, 80a, 72b and 80b; 74a, 92a, 84b, and 92b; 88a and 88b; and 76a and 76b) allows the sidewall 7 to be constructed in an overlapping fashion so a thickness T2 of the sidewall 7 (see FIG. 3) remains constant throughout a length of the trailer 10 (see FIG. 1). A wall of the trailer 10 can have any number of panels 5a, 5b, and therefore can have any number of joints between panels 5a, 5b as described above. For example, the wall of the trailer 10 can be 53 feet in length and can have multiple panels 5 and panel joints according to the present invention.

In those embodiments in which the panels 5a have first and second offset portions 32b, 44b as described above, the first and second main portions 20a and 28a, respectively, can be couched in the first and second offset portions 32b and 44b, respectively, to limit the extent to which the first and second main portions 20a, 28a protrude beyond the interior wall of the trailer 10. In other words, in some embodiments the offset portions 32b and 44b, respectively, are offset from the planes 72 and 80 defined by the first and second main portions 20 and 28 by approximately the thickness T1. Protrusions beyond the interior wall of the trailer 10 and into the interior region of the trailer 10 are thus lessened or altogether eliminated. A smooth interior wall of the trailer 10 is often desirable because such a wall can eliminate the need for a lining (e.g., plywood) that at times is utilized to make the interior walls of trailers smooth such that cargo or cargo moving devices do not become caught on the protrusions into the interior surface. In addition, by couching the first and second main portions 20a, 28a in the first and second offset portions 32b and 44b, the impact resistance to the wall panels 5 can be significantly increased.

If desired, reinforcing members 102 can be coupled to the sidewall panels 5 to provide added rigidity and strength to the sidewall 7. However, reinforcing members 102 are not required to practice the present invention. The reinforcing members 102 can be formed or constructed of materials suitable for a trailer sidewall, such as those discussed above with respect to the sidewall panels 7 (e.g., steel, aluminum, or other metals, composite materials, and the like). In some embodiments for example, the reinforcing members 102 are strips or plates of 0.074 inch thick ASTM 653 grade 80 steel, although other members having different thicknesses, meeting different specifications, and having different grades can instead be used.

The reinforcing member 102 defines a thickness T3 and a width W4, where the width W4 is defined as the width of the reinforcing member 102 measured in cross-section. In some embodiments, the thickness T3 is substantially equal to the distance D1, and the width W4 is slightly less than the width W2 such that the reinforcing member 102 can be couched in the stiffening portions 24a, 24b, thereby limiting the extent to which the reinforcing member 102 protrudes beyond the interior wall of the trailer 10. By way of example only, the reinforcing members 102 in some embodiments each have a thickness of approximately 0.074 inches and a width of approximately 2.0 inches. In some embodiments, the couched relationship between the reinforcing member 102 and the stiffening portions 24a, 24b as just described is employed for each panel 5 in a cargo body, thereby providing the entire interior surface of the cargo body with a substantially planar surface.

The reinforcing member 102 can include one or more logistics apertures 105. If desired, the locations and shapes of the logistics apertures 105 can correspond with those of the logistics apertures 100 such that the sets of logistics apertures 100 and 105 cooperate to enable cargo to be secured and/or stabilized within the trailer 10.

With reference to FIGS. 2 and 3, rivets 110 are inserted through corresponding columns of apertures 115 to couple overlapping portions of the first and second sidewall panels 5*a* and 5*b* and to couple reinforcing members 102 to the sidewall panels 5. Reinforcing members 102 can be coupled to the respective sidewall panels 5 either before, during, or after adjacent sidewall panels 5 are overlapped and coupled, and can be coupled with the same or different fasteners (or in the same or different manner) as used to couple the first and second sidewall panels 5*a*, 5*b* together. The heads of the rivets 110 can be completely couched in recessed regions of the apertures 115 to lessen or eliminate protrusions beyond the interior and/or exterior surfaces of the trailer 10, in which case dimension D1 can be slightly larger than dimension T3 and/or the heads of the rivets 110 can be countersunk in the apertures 115. In other embodiments, the panels 5*a*, 5*b* can be coupled together in any other suitable manner, such as by using adhesives, welding, or bonding, by using any number of conventional devices (e.g. belts, biscuits, bolts, brackets, bridges, chains, clamps, clasps, clips, dowels, latches, pegs, pins, posts, screws, and the like), or any combination thereof. The reinforcing members 102 can also be coupled to the sidewall 7 as described above in any of these alternative manners.

The sidewall 7 of the present invention can be assembled in a number of different manners. In some embodiments, consecutive sidewall panels 5 are oriented from the rear of the trailer 10 to the front of the trailer 10 such that the second offset portion 44 of each sidewall panel 5 is closer to the rear of the trailer 10 than the first main portion 20 of each sidewall panel 5. In other embodiments, consecutive sidewall panels 5 are oriented from the front of the trailer 10 to the rear of the trailer 10 such that the second offset portion 44 of each sidewall panel 5 is closer to the front of the trailer 10 than the first main portion 20 of each sidewall panel 5. In yet other embodiments, consecutive sidewall panels 5 are oriented in different directions (e.g., from the front of the trailer 10 to the rear of the trailer 10 and from the rear of the trailer 10 to the front of the trailer 10) such that splicer plates or other manners are employed to join alternatively directed runs of sidewall panels 5.

The sidewall 7 may be constructed using sidewall panels 5 having the same width W1 or using sidewall panels 5 having varying widths W1. When sidewall panels 5 of varying widths W1 are utilized, sidewall panels 5 of smaller widths W1 can be placed in areas of the trailer 10 that require additional structural integrity. Utilization of sidewall panels 5 having the same width W1 provides for ease of assembly and reduces the number of components a manufacture of trailers 10 needs on-hand. Also, trailers 10 having different lengths L1 can utilize sets of sidewall panels 5 having different widths W1 to achieve a design with minimal scrap.

The sidewall 7 constructions discussed above can also allow for ease of repair. If a sidewall panel 5 or a portion thereof becomes damaged during use, the damaged portion of the sidewall panel 5 can be removed and replaced with a corresponding sidewall panel 5. Utilization of the repeating pattern of sidewall panels 5 allows for a trailer 10 owner or repair shop to keep a reduced number of parts on-hand to accomplish such repairs.

The embodiment of the sidewall panels 5 illustrated in the accompanying figures includes a number of elements such as first and second main portions 20 and 28, respectively, stiffening portions 24, first and second offset portions 32 and 44, respectively, and a post portion 40. However, it will be readily apparent to one of ordinary skill in the art that alternative embodiments of the present invention can include alternative dimensions, additional elements, fewer elements, alternatively configured elements, alternative overlapping joints, and the like.

In some alternative embodiments, a sidewall panel includes a main portion and a post portion. For assembly, the main portion of a second sidewall panel overlaps the post portion and part of the main portion of the first sidewall panel. The main portion of the second sidewall panel is then fastened to the overlapped part of the main portion of the first sidewall panel. Such a design can be similar to that illustrated in FIGS. 1-3, but in which the jogged portion 36 does not exist and/or the second offset portion 44 lies in substantially the same plane as the first and second main portions 20, 28. In such designs, the resulting sidewall 7 is not necessarily straight (i.e., each additional sidewall panel is offset from the adjacent sidewall panel by, for example, the thickness of the sidewall panel). In some embodiments, the overlapped part of the main portion(s) 20, 28 of the first sidewall panel include an offset portion (such as jogged portion 36) to compensate for a thickness of the main portion of the second sidewall panel, thereby providing a straight sidewall 7. Similar results can be generated in other manners, such as by employing a panel design as illustrated in FIGS. 1-3 but in which no jogged portion 36 exists and in which the first stiffening jogged portion 52 of the stiffening portion 24 is longer than the second stiffening jogged portion 56 to enable the second offset portion 44 to overlap the main portion 28 of the first sidewall panel.

It should be noted that although the panels 5 can employ offset portions 32, 44 that provide a recess within which an adjacent panel can be received as discussed above and as illustrated in the figures, offset portions 32, 44 need not necessarily exist in some embodiments of the present invention. Also, although the panels 5 can employ stiffening portions 24 as discussed above and illustrated in the figures, stiffening portions 24 need not necessarily exist in some embodiments of the present invention (in which cases the first and second main portions 20, 28 described above can be defined as a single main portion).

In other alternative embodiments of the present invention, a sidewall panel includes first and second main portions disposed on each side of a post portion. For assembly, the first main portion of the second panel may be overlapped on (1) the second main portion and part of the first main portion of the first sidewall panel such that the post portion is enclosed, (2) the second main portion of the first sidewall panel such that the post portion is at least partially enclosed, or (3) at least part of the second main portion of the first sidewall panel. The first main portion of the second sidewall panel can then be fastened to the overlapped part of the first and/or second main portions of the first sidewall panel. In some embodiments, the overlapped part of the first and/or second main portions can include an offset portion which compensates for a thickness of the main portion of the second sidewall panel.

In other alternative embodiments, a sidewall panel 5 includes at least two post portions. For assembly, any number (e.g., none, one, two, etc.) of the post portions can be overlapped in a fashion similar to those discussed above. For example, two, one, or none of the post portions of a first sidewall panel can be overlapped by a second sidewall panel.

Other alternative embodiments of sidewall panels can include any combination of the above discussed elements.

Figure 4:
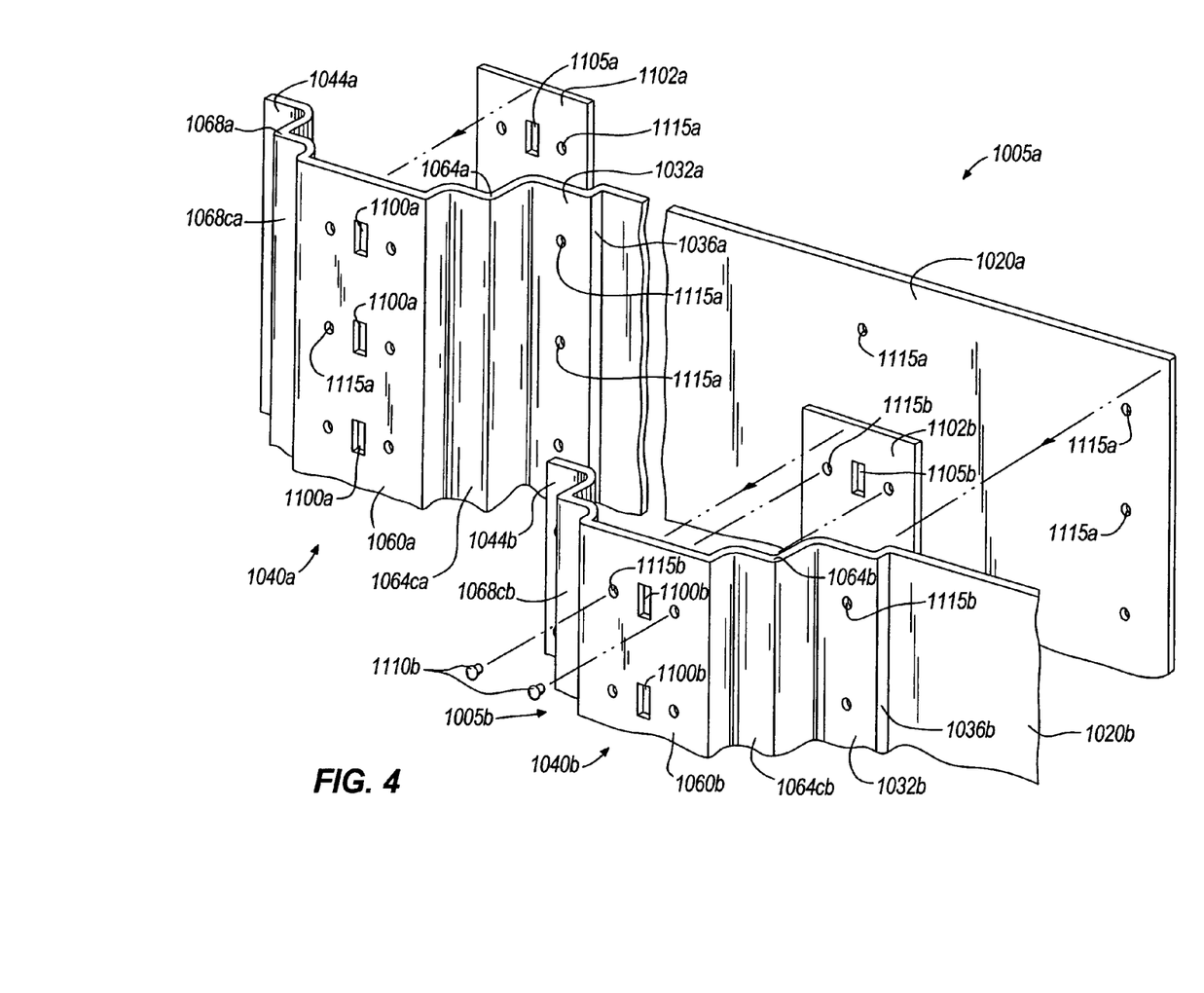
FIG. 4 is an exploded perspective view of an overlapping joint formed by two consecutive sidewall panels, in accordance with a second embodiment of the present invention.

An example of an alternative embodiment of sidewall panels 1005 is illustrated in FIG. 4. The sidewall panels 1005 and the construction defined by the sidewall panels 1005 illustrated in FIG. 4 are similar to that shown in the embodiment of FIGS. 1-3 described above. Accordingly, reference is hereby made to the description of the embodiment of FIGS. 1-3 above for a more complete description of the wall construction of FIG. 4, corresponding features of the sidewall panels 1005 in FIG. 4, and alternatives to such features. The sidewall panels 1005 provide a sidewall having a smooth side positioned on the exterior of the trailer. As illustrated in FIG. 4, the interior space of the trailer is in the bottom left-hand area of FIG. 4, while the space outside the trailer is in the top right-hand area of FIG. 4. Among other advantages, a smooth exterior wall of the trailer allows for ease in the application of advertisements or logos. In such embodiments, an application of lining (e.g., plywood) can be secured on the interior walls of the trailer 10.

Referring specifically to FIG. 4, the sidewall panels 1005 include a main portion 1020, a first offset portion 1032, an offset jogged portion 1036 serving as a transition between the main portion 1020 and the first offset portion 1032, a post portion 1040, and a second offset portion 1044. The post portion 1040 includes a post plateau 1060, a first post jogged portion 1064 serving as a transition between the first offset portion 1032 and the post plateau 1060, and a second post jogged portion 1068 serving as a transition between the post plateau 1060 and the second offset portion 1044. In some cases (as shown in FIG. 4), the first post jogged portion 1064 includes a first lining support 1064c, and the second post jogged portion 1068 includes a second lining support 1068c. In such embodiments, the first and second lining supports 1064c and 1068c can be utilized for connection of lining to the sidewall formed using the sidewall panels 1005. However, the first and second lining supports 1064c and 1068c are not required to practice the present invention. Logistics apertures 1100 similar to the logistic apertures 100 are centered along the post plateau 1060. The illustrated sidewall panels 1005 do not include a stiffening portion. In other embodiments, the sidewall panels 1005 can include a stiffening portion similar to the stiffening portion 24 of the sidewall panels 5.

The sidewall panels 1005 illustrated in FIG. 4 can be assembled by overlapping a first sidewall panel 1005a and a second sidewall panel 1005b to form an overlapped joint defining overlapping portions of the first and second sidewall panels 1005a and 1005b, respectively. The elements of each of the sidewall panels 1005a and 1005b are labeled to correspond to the sidewall panel 1005a or 1005b that includes such elements (e.g., the main portion 1020 of the first sidewall panel 1005a is described and labeled as the main portion 1020a). The overlapping joint of the panels 1005a and 1005b includes the main portion 1020a of sidewall panel 1005a overlapping the first offset portion 1032b and the second offset portion 1044b of the second sidewall panel 1005b. Spacing apart the main portion 1020a from the post plateau 1060b provides room for a cargo-securing device or element to be partially or entirely received within the logistics apertures 1100 while additionally providing added strength and rigidity to the sidewall.

Reinforcing members 1102 similar to the reinforcing members 102 can be coupled to the sidewall panels 1005 to provide added rigidity and strength to the sidewall. The reinforcing member 1102 can be attached to the post plateau 1060 in the space fainted between the main portion 1020a and the post plateau 1060b. The reinforcing member 1102 can include one or more logistics apertures 1105. If desired, the locations and shapes of the logistics apertures 1105 can correspond with those of the logistics apertures 1100 such that the sets of logistics apertures 1100 and 1105 cooperate to enable cargo to be secured and/or stabilized within the trailer.

With continued reference to FIG. 4, rivets 1110 are inserted through corresponding apertures 1115 to couple overlapping portions of the first and second sidewall panels 1005a and 1005b and to couple reinforcing members 1102 to the sidewall panels 1005. Reinforcing members 1102 are coupled to the respective sidewall panels 1005 before adjacent sidewall panels 1005 are overlapped and coupled, and can be coupled with the same or different fasteners (or in the same or different manner) used to couple the first and second sidewall panels 1005a and 1005b together. The rivets 1110 can be secured similar to rivets 110 in the embodiment of FIGS. 1-3 described above.

The remainder of the construction and assembly of the sidewall panels 1005 is similar to that of the sidewall panels 5, is therefore not discussed further herein.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

The invention claimed is:

1. A method of constructing a cargo body, comprising:
providing a first cargo body panel comprising a main portion having thickness;
providing a second cargo body panel;
forming a post portion in the first cargo body panel integrally with the main portion;
forming a base portion of the post portion;
forming a distal portion of the post portion located a distance from the base portion substantially greater than the thickness of the main portion;
forming a stiffening portion having stiffening plateau defining a plane spaced apart from and substantially parallel to first and second planes defined by the main portion and the distal portion;
overlapping at least part of the first cargo body panel over the second cargo body panel; and
receiving a plate in an at least partially recessed position within the stiffening portion.

2. The method of claim 1, wherein the cargo body panels are constructed of steel, and wherein the distance is approximately 25 times the thickness of the main portion.

3. The method of claim 1, wherein the cargo body panels are constructed of steel, and wherein the distance is between 21 and 35 times the thickness of the main portion.

4. The method of claim 1, wherein the cargo body panels are constructed of steel, and wherein the distance is between 17 and 45 times the thickness of the main portion.

5. The method of claim 1, wherein the cargo body panels are constructed of steel, and wherein the distance is between 13 and 53 times the thickness of the main portion.

6. The method of claim 1, further comprising forming an offset portion in the first cargo body panel adjacent the base portion, wherein the offset portion defines a plane substantially parallel to and located between planes defined by the main and distal portions.

7. The method of claim 6, wherein forming the offset portion comprises forming the offset portion between the main portion and the post portion.

8. The method of claim 6, wherein forming the offset portion comprises forming the offset portion on a side of the post portion opposite the main portion.

9. The method of claim 6, wherein forming the offset portion comprises forming the offset portion on opposite sides of the post portion.

10. The method of claim 6, wherein the plane defined by the offset portion is spaced apart from the plane defined by the main portion by a distance substantially equal to the thickness the main portion.

11. The method of claim 6, wherein forming the offset portion comprises integrally forming the offset portion with the main portion.

12. The method of claim 6, further comprising forming a plurality of apertures in the offset portion, each of the plurality of apertures adapted to receive respective fasteners.

13. The method of claim 1, wherein forming the stiffening portion comprises forming the stiffening portion on a side of the main portion opposite the post portion.

14. The method of claim 1, wherein forming the stiffening portion comprises forming the stiffening portion between different parts of the main portion.

15. The method of claim 1 wherein forming the stiffening portion comprises forming the stiffening portion integrally with the main portion.

16. The method of claim 1, wherein forming the stiffening portion comprises forming the stiffening portion with a cross-sectional width substantially similar to a cross-sectional width of the post portion.

17. The method of claim 1, wherein forming the stiffening portion comprises forming the stiffening portion with a cross-sectional width substantially similar to a cross-sectional width of the plate.

18. The method of claim 1, further comprising forming at least one logistics aperture in the plate.

19. The method of claim 18, further comprising forming at least one logistics aperture in the stiffening plateau in a position corresponding to the at least one logistics aperture in the plate.

20. The method of claim 1, further comprising forming at least one logistics aperture in the stiffening plateau.

21. The method of claim 1, further comprising forming the first and second cargo body panels by roil forming.

22. The method of claim 1, wherein forming the distal portion of the post portion comprises forming the distal portion in a plane substantially parallel to and located outboard of another plane defined by the main portion with respect to an interior of the cargo body.

23. The method of claim 1, further comprising at least partially enclosing an interior of the post portion by placing the post portion of the first cargo body panel in overlapping relationship with the portion of the second cargo body panel.

* * * * *